Figure 1:
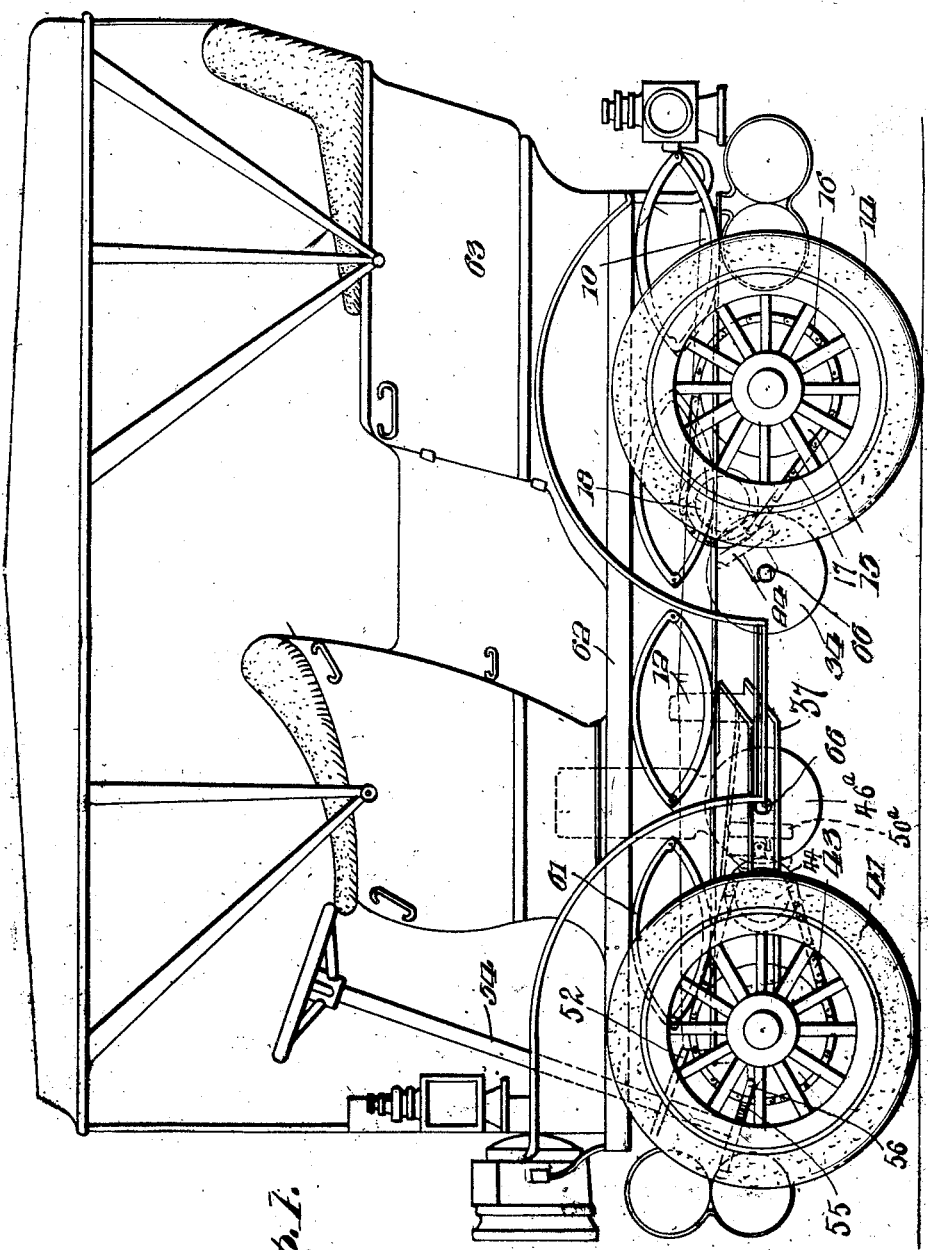

D. N. BAXTER.
AUTOMOBILE.
APPLICATION FILED JULY 7, 1909.

1,063,003.

Patented May 27, 1913.
4 SHEETS—SHEET 2.

Witnesses

Inventor
D. N. Baxter
By
Attorneys

D. N. BAXTER.
AUTOMOBILE.
APPLICATION FILED JULY 7, 1909.
1,063,003.
Patented May 27, 1913.
4 SHEETS—SHEET 3.
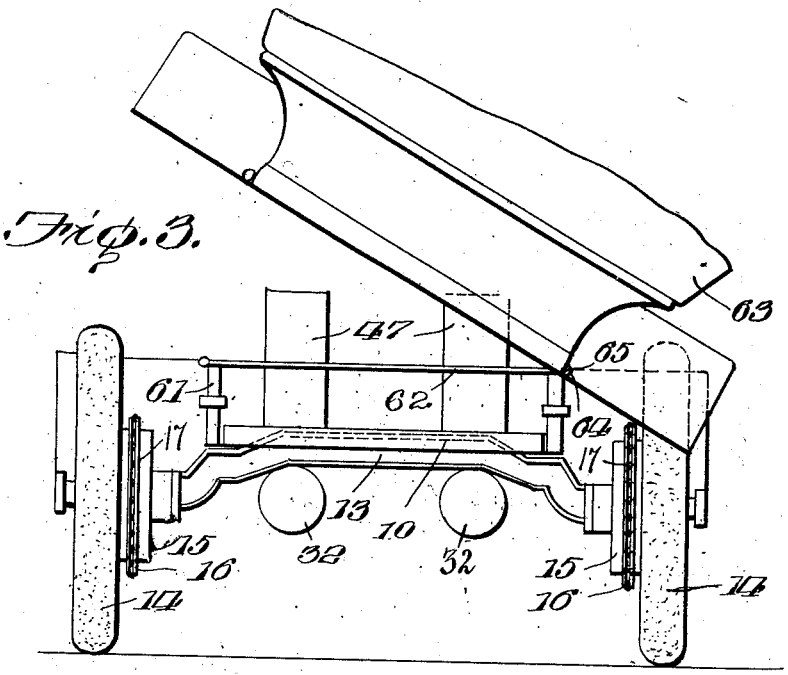
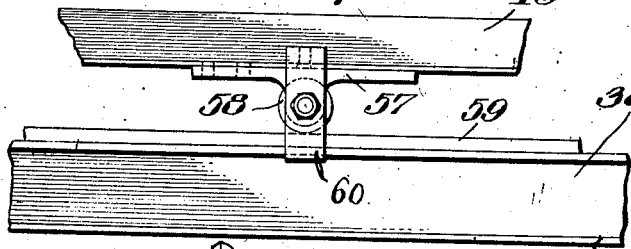
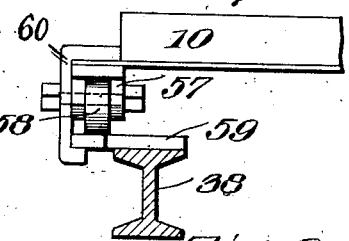
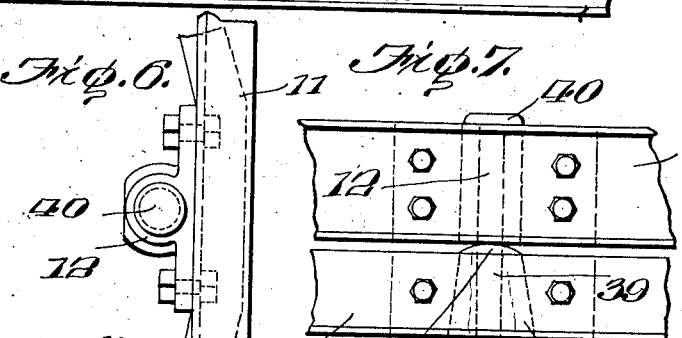
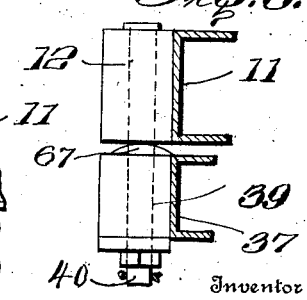

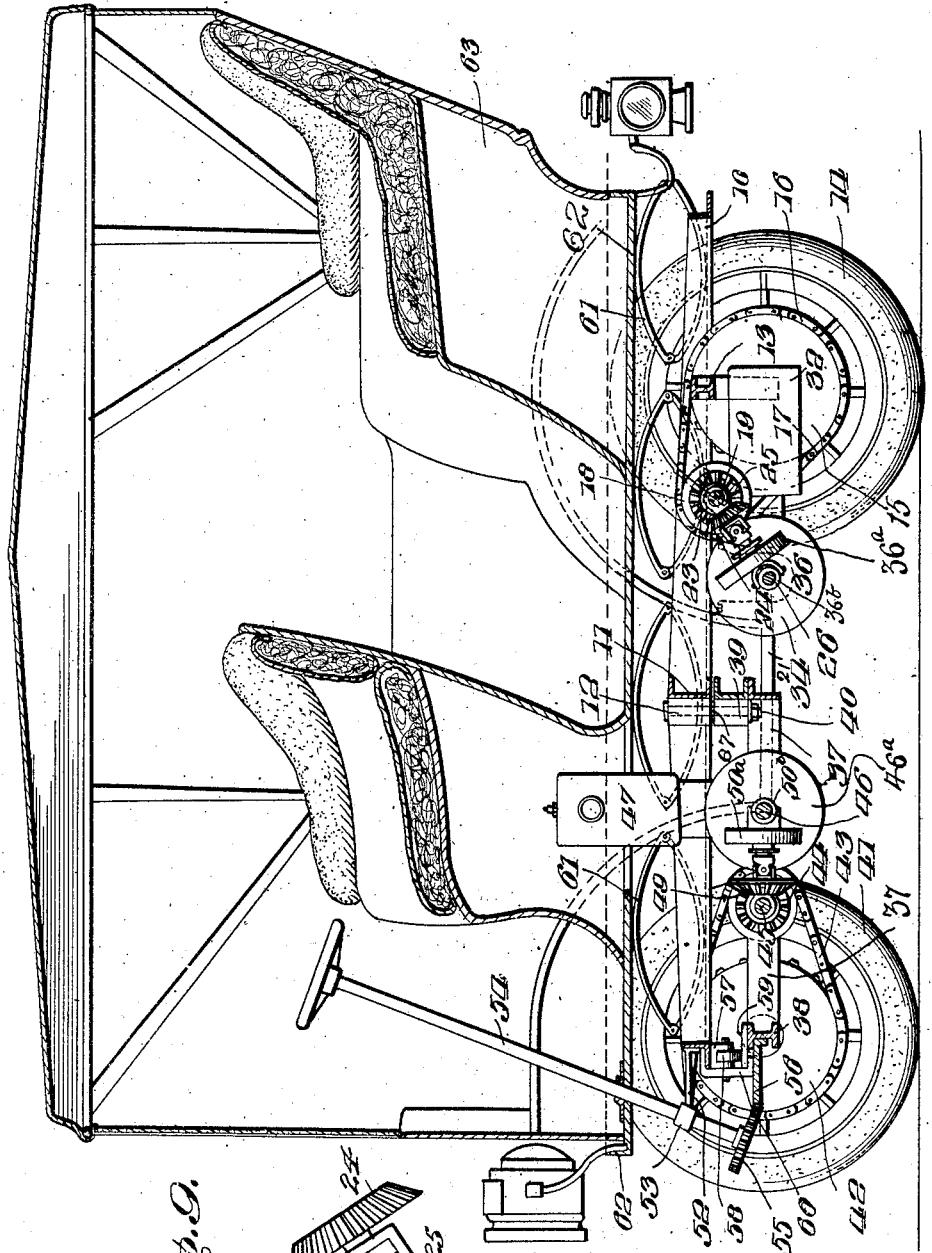

UNITED STATES PATENT OFFICE.

DANIEL N. BAXTER, OF WICHITA, KANSAS, ASSIGNOR TO DANIEL N. BAXTER, TRUSTEE, OF WICHITA, KANSAS.

AUTOMOBILE.

1,063,003.  Specification of Letters Patent.  Patented May 27, 1913.

Application filed July 7, 1909. Serial No. 506,382.

*To all whom it may concern:*

Be it known that I, DANIEL N. BAXTER, a citizen of the United States, residing at Wichita, in the county of Sedgwick and State of Kansas, have invented certain new and useful Improvements in Automobiles, of which the following is a specification.

This invention relates generally to motor vehicles and refers particularly to the specific construction of the same whereby a vehicle of greater efficiency is produced.

An object of this invention is to provide a vehicle of this character with a swiveled body, whereby the wheels thereof will adapt themselves to the unevenness of the roads so that traction will be maintained at all times between each of the wheels and the roadway. This feature thus embodies a structure wherein the strain upon the tires and the engine which operates the vehicle is lessened and which will materially add to the life of the same.

The invention has for another object the construction of a vehicle of this character which may be easily handled by so arranging the supporting frames thereof that the vehicle may be turned in a limited space and wherein the length of the vehicle may be considerably shortened without eliminating or cramping any of the mechanism necessary for the satisfactory propelling of the vehicle.

The invention further contemplates the provision of means whereby the power is applied to each of the four wheels of the vehicle, thus effecting a greater power of the vehicle by doubling the effective strength of the machine and constructing the machine without the necessity of providing long driving shafts or chains to transmit the power from the engines to the several wheels.

The invention still further contemplates the disposition of the power elements in the forward and rear ends of the vehicle and in direct communication with the respective axles, whereupon the power elements remain in alinement with the wheels carried by the axles upon the swinging of the frames past one another when the vehicle is turned, thus insuring a direct and effective pulling power of the machine on curves and on uneven roads without the danger of straining the transmissions which connect the same. In this connection the arrangement of the motors which supply the power, and the transmissions connecting the motors to the wheels are such that the load is practically equally distributed to all four of the supporting wheels of the vehicle thus effecting an equal traction of the same.

For a full understanding of the invention reference is to be had to the following description and accompanying drawings, in which:—

Figure 2:
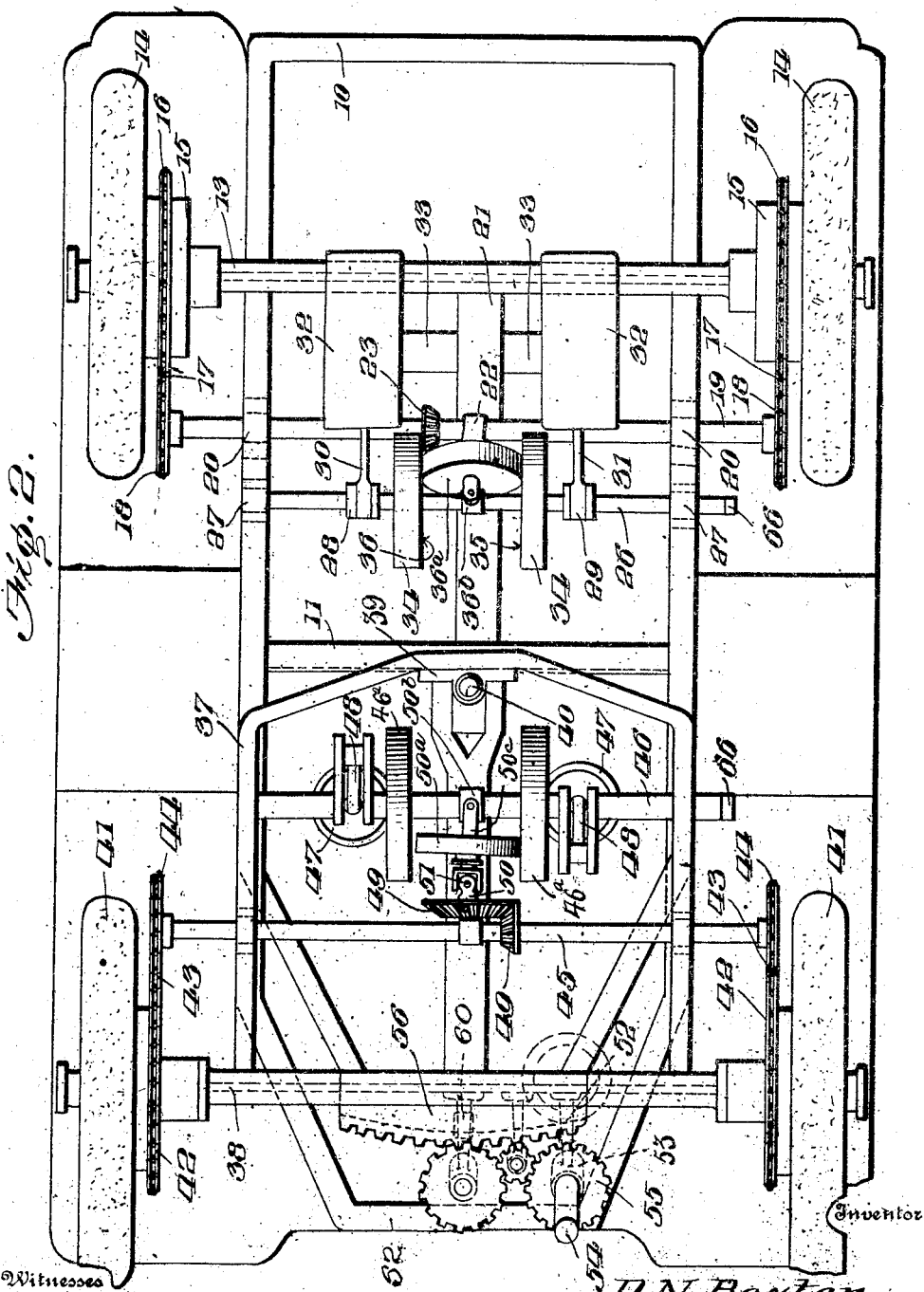

Figure 1 is a side elevation of the complete motor vehicle. Fig. 2 is a bottom plan view of the same. Fig. 3 is a rear elevation of the vehicle. Fig. 4 is a detailed fragmentary view showing the construction of the bearing roller which supports the two swiveled frames. Fig. 5 is a side elevation of the same. Fig. 6 is a top plan view of the connection between the swiveled frames, a fragmentary view of the same being disclosed. Fig. 7 is a rear elevation of the same. Fig. 8 is a side elevation thereof, and Fig. 9 is a longitudinal vertical section through the vehicle. Fig. 10 is an enlarged sectional view of the mechanism for transmitting the motion of the rear driving shaft 19 to the rear jack shaft, the friction wheel 36ª being shown in section.

Corresponding and like parts are referred to in the following description and indicated in all the views of the drawings by the same reference characters.

Referring to the drawings in which is disclosed an embodiment of the invention the numeral 10 designates the main frame of the vehicle which comprises an angle bar which is bent to form a substantially rectangular frame having its sides slightly converged at its forward end. The frame 10 is provided with a transverse bar 11 which is also formed of an angle bar and which is located intermediately between the ends of the sides of the main frame 10 and secured in any suitable manner, as by rivets or the like. The central portion of the brace 11 is provided with a suitable bearing 12 which preferably comprises a circular block having oppositely and laterally extended flanges which are riveted or otherwise permanently secured against the forward face of the brace 11. The block is provided with a vertical bore for a purpose hereinafter set forth. At the rear end of the main frame 10 an arched axle 13 is transversely positioned which is secured rigidly to the main frame 10 and which carries upon its opposite extremities the wheels 14 which support the rear end of the machine. The wheels 14 are each provided with drums 15 which are provided with sprockets 16 engaged by chains 17 by which the wheels 14 are driven. The chains 17 extend forwardly from the sprockets 16 and engage over smaller sprockets 18 located upon the opposite extremities of a jack-shaft 19. The jack-shaft 19 is journaled in suitable bearings 20 which are carried upon the opposite sides of the main frame 10 forwardly of the wheels 14. Extended from the axle 13 to the brace 11 is a second brace 21 which is positioned longitudinally and centrally of the main frame 10. A bearing 22 extends from the brace 21 and supports the intermediate portion of the jack-shaft 19. The shaft 19 carries adjacent to its central portion a beveled pinion 23 meshing with the beveled gear 24 arranged upon a stub shaft 25. The crank-shaft or drive-shaft 26 is transversely journaled in depending brackets 27 in the frame 10 forwardly of the jack-shaft 19 and is provided with crank portions 28 and 29 on which are carried the piston rods 30 and 31 of the engine cylinders 32. The engine cylinders 32 are carried in a horizontal position upon supports 33 which are laterally extended from the brace 21. On the crank-shaft 26 are mounted fly-wheels 34 which are spaced apart upon the opposite sides of the brace 21.

The inner opposite faces of the fly-wheels 34 are provided with flattened or friction faces 35 and 36 with one or the other of which the friction disk 36ª engages. The disk 36ª is splined to the shaft 25 and is mounted for longitudinal movement thereon to enable various speeds of the shaft 25 to be obtained from the motor. A sleeve 36ᵇ is positioned centrally upon the crank-shaft 26 and pivotally supports the inner end of the stub-shaft 25, and is employed in shifting the disk 36ª to alternately engage the same against the faces 35 and 36 of the fly-wheels 34.

Positioned beneath the forward end of the main frame 10 is a secondary frame 37 which is approximately U-shaped and which carries at its forward end the front axle 38 which supports the forward end of the vehicle.

The secondary frame 37 is formed of angle iron and is supported at its rear end immediately beneath the central portion of the brace 11. Upon the rear end of the secondary frame 37 a vertical pivot bearing 39 is provided, formed with a vertical bore which registers with the bore of bearing 12. Through these alining bores passes a king bolt 40 which forms the pivotal center for the frame 37. The bore of the bearing 39 is outwardly and downwardly flared for the purpose of permitting the frame 37 to have a rocking movement upon the king bolt 40. This permits a free lateral reciprocation of the secondary frame 37 and prevents this reciprocation being transmitted to the main frame.

For the purpose of furthering the swivel motion of the frame 37 a rounded washer 67 is positioned between the two bearings 12 and 39 about the king-bolt 40, the flattened face of the washer lying against the bearing 39 while the rounded face extends upwardly and rocks upon the upper bearing 12.

The front axle 38 is provided with wheels 41 of any suitable construction which are actuated through the medium of sprockets 44 located upon the opposite ends of a second jack-shaft 45.

The second jack shaft 45 is mounted in the frame 37 rearward of the front axle 38. A corresponding crank shaft 46 is mounted on the secondary frame 37 rearwardly of the jack shaft 45 and is driven by piston rods 48 operating in vertical cylinders 47. The jack shaft 45 is driven from the crank shaft 46 by means of bevel gears 49, one of which is mounted upon a stub shaft 50, the other being mounted on the shaft 45. The stub shaft 50 is formed in two sections connected to each other by a universal joint, and splined upon one of these sections of the stub shaft 50 is a friction disk 50ª. A sleeve 50ᵇ is slidably mounted upon the crank shaft 46, to which sleeve the inner extremity of the section 50ᶜ of the stub shaft is pivotally connected. By shifting this sleeve 50ᵇ the section 50ᶜ of the stub shaft will be reciprocated and will carry the friction disk 50ª into engagement with the inner faces of either of the friction wheels 46ª. By this means the vehicle may be driven either forwardly or rearwardly, and by shifting the friction disk 50ª upon the stub shaft section 50ᶜ, various speeds may be obtained. I have not shown any means for shifting the disk 50ª as such shifting means is common and well known.

A bracket 52 is outwardly extended from the forward end of the main frame 10 which carries a suitable bearing 53 to support the lower end of a steering post 54. The steering post 54 is projected downwardly from the bearing 53 and carries a gear 55 which is arranged to actuate a segment 56 rigidly secured across the forward edge of the axle 38. The opposite end of the steering post 54 extends upwardly above the frame 10 to a position adjacent the seat of the operator. A forked bracket 57 is carried at the forward end of the main frame 10 above the axle 38 and carries a roller 58 which rests upon a roller plate 59 disposed longitudinally upon the upper face of the front axle 38. A guard finger 60 depends from the forward end of the main frame 10 and extends downwardly to engage against the forwardly curved edge of the roller plate 59 and is turned inwardly to bear beneath the same to prevent the upward movement of the frame 10, or the relative vertical displacement of the frame 37.

Upon the opposite sides of the main frame 10 are positioned a plurality of full elliptical springs 61 which are preferably eight in number, four being disposed upon each side of the main frame, and upon which is rigidly secured a body frame 62. The body frame 62 preferably comprises a frame of light material, preferably steel, and which supports the body 63 of the machine. The body 63 is preferably secured to the frame 62 through the medium of a plurality of hinges 64, which may be of any number desired, the pintles 65 being removable to permit of the quick detachment of the body 63 from the frame 62. As seen in Fig. 3 the hinges 64 are disposed at one side of the body 63 and the frame 62 so as to permit one side of the body to be swung upward when it is desired to gain access to the operative parts of the vehicle. The crank-shafts 26 and 46 are each extended beyond the frame 10 and squared as at 66 for the application of crank-handles or the like when it is desired to start the machine.

It will be seen that I have provided a separate driving means for both the front and rear axles and that the motor for driving the front axle and the front axle itself is mounted upon a skeleton frame which is laterally movable relative to the main frame and which is vertically movable independent of the main frame. It will also be seen that this frame 37 which carries the motor for the front axle, and also carries the front axle, is laterally tiltable by reason of the enlarged conical bore of the bearing 39 and because of the rounded washer 67 which forms a rounded bearing between the frame 37 and the main frame, and specifically between the rear end of the frame 37 and the cross piece 11.

It is also to be particularly noted that the cylinders 47 of the motor for the front axle are upwardly extended and pass through an opening in the floor of the body of the vehicle and into the space beneath the front seat of the vehicle. I thus provide for disposing the cylinders 47 in a vertical position, thus permitting the length of the vehicle to be reduced. At the same time the jar due to the reciprocations of the front engine is not transmitted to the main frame as it would be if the cylinders 47 were connected directly to the main frame. Furthermore, by mounting the cylinders 47 upon the secondary frame, the cylinders are allowed to move with the secondary frame, thus doing away with complicated connections which would be otherwise necessary between the piston rods of these cylinders and the secondary frame.

By employing a separate engine and a separate transmission for each of the frames a direct line of power is secured which eliminates complications in the transmission mechanism which would otherwise be necessary in applying the power to the four wheels of the vehicle.

By hinging the body upon the main frame access can be readily gained to the working parts of the machine since the body 63 can be swung upwardly and outwardly at either side of the frame by the withdrawal of the pintles 65 disposed upon the opposite sides of the frame 62.

Having thus described the invention what is claimed as new is:—

1. In a motor vehicle, a main skeleton frame, a secondary frame pivoted at its rear end to the main frame for movement in a horizontal plane, traction wheels mounted on the forward ends of the secondary frame, driving mechanism mounted on said secondary frame and movable therewith, a hollow body supported upon the main frame, and motors carried on the secondary frame extending up through the main frame and into said body, said motors being operatively connected to the driving mechanism and movable with the secondary frame.

2. In a motor vehicle, a main frame, a secondary frame pivoted at its rear end to the main frame for movement in a horizontal plane, traction wheels mounted on the forward ends of the secondary frame, driving mechanism mounted on said secondary frame and movable therewith, a body supported upon the main frame and having a hollow seat carried thereon, and motors carried on the secondary frame extending up through the main frame and through the body and into the hollow seat, said motors being operatively connected to the driving mechanism.

In testimony whereof I affix my signature in presence of two witnesses.

DANIEL N. BAXTER. [L. S.]

Witnesses:
 G. A. BAXTER,
 R. H. HAYNES.